US009879564B2

(12) United States Patent
Pesteil et al.

(10) Patent No.: US 9,879,564 B2
(45) Date of Patent: Jan. 30, 2018

(54) VORTEX GENERATORS PLACED IN THE INTERBLADE CHANNEL OF A COMPRESSOR RECTIFIER

(71) Applicant: SNECMA, Paris (FR)

(72) Inventors: Agnes Claire Marie Pesteil, Alfortville (FR); Vincent Paul Gabriel Perrot, Maisons Alfort (FR); Fatma Ceyhun Sahin, Rhode-Saint-Genese (BE)

(73) Assignee: SNECMA, Paris (FR)

( * ) Notice: Subject to any disclaimer, the term of this patent is extended or adjusted under 35 U.S.C. 154(b) by 447 days.

(21) Appl. No.: 14/383,251

(22) PCT Filed: Mar. 7, 2013

(86) PCT No.: PCT/FR2013/050480

§ 371 (c)(1),
(2) Date: Sep. 5, 2014

(87) PCT Pub. No.: WO2013/132190

PCT Pub. Date: Sep. 12, 2013

(65) Prior Publication Data

US 2015/0030439 A1 Jan. 29, 2015

(30) Foreign Application Priority Data

Mar. 9, 2012 (FR) ..................................... 12 52159

(51) Int. Cl.
*F03D 5/00* (2006.01)
*F01D 25/24* (2006.01)
(Continued)

(52) U.S. Cl.
CPC ........... *F01D 25/24* (2013.01); *F04D 29/541* (2013.01); *F04D 29/681* (2013.01); *F05D 2240/127* (2013.01); *F05D 2250/11* (2013.01)

(58) Field of Classification Search
CPC . F01D 9/042; F01D 9/045; F01D 9/06; F04D 29/542
(Continued)

(56) References Cited

U.S. PATENT DOCUMENTS 2,735,612 A * 2/1956 Hausmann .............. F01D 5/143
138/111
4,023,350 A 5/1977 Hovan et al.
(Continued)

FOREIGN PATENT DOCUMENTS

EP 0 976 928 A2 2/2000
EP 1 927 723 A1 6/2008
(Continued)

OTHER PUBLICATIONS

International Search Report dated Jul. 16, 2013, in PCT/FR13/050480 filed Mar. 7, 2013.

*Primary Examiner* — Craig Kim
*Assistant Examiner* — Jason Mikus
(74) *Attorney, Agent, or Firm* — Oblon, McClelland, Maier & Neustadt, L.L.P.

(57) ABSTRACT

A compressor rectifier of a turbomachine including a plurality of stationary blades extending in a circular fashion between an inner shroud and an outer shroud that are concentric and define interblade channels forming an air duct in which air to be compressed flows, the inner shroud including at least one vortex generator extending into the air duct to reduce corner vortices. The vortex generator is positioned axially in the interblade channel, between the axial position of a leading edge of the blades and those of a trailing edge thereof.

6 Claims, 3 Drawing Sheets

(51) Int. Cl.
*F04D 29/54* (2006.01)
*F04D 29/68* (2006.01)

(58) Field of Classification Search
USPC ........................................................ 415/209.1
See application file for complete search history.

(56) References Cited

U.S. PATENT DOCUMENTS

| | | | | |
|---|---|---|---|---|
| 2008/0095614 | A1* | 4/2008 | Aubin | F01D 5/143 415/144 |
| 2010/0143140 | A1* | 6/2010 | Guemmer | F01D 5/143 416/193 A |
| 2012/0263587 | A1 | 10/2012 | Hergt et al. | |
| 2013/0064673 | A1 | 3/2013 | Domercq et al. | |

FOREIGN PATENT DOCUMENTS

| | | | |
|---|---|---|---|
| EP | 2 194 232 | A2 | 6/2010 |
| FR | 2 960 604 | A1 | 12/2011 |
| WO | WO 2008/046389 | A1 | 4/2008 |
| WO | WO 2011/054812 | A2 | 5/2011 |

* cited by examiner

VORTEX GENERATORS PLACED IN THE INTERBLADE CHANNEL OF A COMPRESSOR RECTIFIER

BACKGROUND OF THE INVENTION

Field of the Invention

The field of the present invention is that of turbine engines and, more particularly, that of the internal aerodynamics of said turbine engines.

Description of the Related Art

A turbine engine for an aircraft generally comprises, from upstream to downstream in the direction of flow of the gases, a blower, one or more compressor stages, for example a low-pressure compressor and a high-pressure compressor, a combustion chamber, one or more turbine stages, for example a high-pressure turbine and a low-pressure turbine, and a gas exhaust nozzle. One turbine may correspond to each compressor, the two being connected by a shaft, thus forming, for example, a high-pressure body and a low-pressure body. A compressor of a turbojet engine is composed of a plurality of successive compression stages, each stage comprising two vane assemblies, namely a movable rotor and a fixed guide vane assembly, or stator. The guide vane assembly conventionally comprises vanes that are arranged side by side and extend between an inner collar and an outer collar coaxial with each other, to which they are connected by their ends.

The presence is frequently found, in particular on heavily loaded compressors, as is in particular the case with high-pressure compressors, of a 3D shedding or "corner vortex" region", which is generally situated at the suction face of the stator vanes, at the inner collar, as from the downstream mid-chord of the vanes. A schematic view of this vortex is given by FIG. 1. The corner effect, which gives rise to the creation of this vortex, is created by the cumulative effects of pressure gradients in the axial direction (increase in static pressure with the passage of the guide vanes) and in the tangential direction (flow tending to go from the high pressures at the pressure face to the low pressures at the suction face of the adjacent vanes). These two effects cause an accumulation of particles with a low kinetic energy in the corner formed by the suction face wall of the vane and the hub. This causes an aerodynamic blockage that degrades the efficiency of the compressor. These vortices are moreover detrimental to the resistance of the compressor to surge phenomena.

It is therefore important to attempt to reduce the size of these corner vortices, if not to eliminate them, in order to improve the efficiency of the compressors and to increase the stability range thereof. Several improvements have thus been proposed, such as for example the patent application WO 2008/046389 or the application FR 2960604, which was filed by the applicant. The solutions envisaged relate to the introduction of vortex generators that are disposed on the inner collar of the compressor, upstream of the fixed or movable wheels. Vortex generators are small fins that are fixed to the inner collar and have the function of creating vortices in the duct. These vortices transfer energy from the main flow to the limit layers, which are thereby accelerated. As it is the low speeds at the stator root that are responsible for the corner vortex, the latter is reduced.

In these two improvements, the vortex generators are integrated in the stator platform, upstream of the vane. In another patent application, FR 11/55158, the applicant recommended using a plurality of vortex generators staged axially upstream of the vanes and offset circumferentially with respect to one another.

The efficacy of these vortex generators is no doubt not optimum and it is desirable to seek to improve it further.

Installing means for deflecting the airflow in the inter-vane channel has been proposed, for example in EP 2194232 A2, EP 1927723 A1 and EP 0976928 A2 as an alternative solution. EP 2194232 A2, in particular, recommends installing vortex generators in the upstream half of the inter-vane channel. However, this solution does not appear to us to be optimum, in particular in the case of a guide vane where the shedding of the inter-vane flow occurs on the rear part of the suction face of the vanes.

BRIEF SUMMARY OF THE INVENTION

The aim of the present invention is to provide improvements to highly loaded compressors so as to control the corner vortices thereof even better and consequently to increase the aerodynamic efficiency thereof.

To this end, the invention relates to a device for rectifying airflow in a turbine engine, in particular in a compressor, said device comprising a plurality of fixed vanes extending circularly between an inner collar and an external collar concentric with each other and defining inter-vane channels forming a duct in which the air to be compressed circulates, said inner collar carrying at least one vortex generator extending inside the air duct in order to reduce the corner vortices, said vortex generator being positioned axially in the inter-vane channel, that is to say between the axial position of the leading edge of the vanes and the axial position of the trailing edge thereof, characterised in that the furthest upstream point of said vortex generator is positioned at two thirds, +/−10%, towards the downstream side of the axial span of the vanes. Thus the vortex generator is placed at the start of the shedding region that is to say at an optimum position for reducing the corner vortex.

In a preferential embodiment the vortex generator has a triangular planar shape extending perpendicularly to said inner collar, said triangle comprising a curvilinear side extending along said inner collar and having its vertex closest to the suction face positioned on said inner collar. This triangle shape, which broadens as it moves away from the suction face, corresponds to the gradual upward extension of the shedding region.

Advantageously, the vortex generator is in the form of a right-angled triangle, the right angle being situated on the side opposite to the suction face of the vane.

Preferentially, the height h of said triangle, measured perpendicularly to said outer collar, is between 2% and 15% of the height of the vane and/or the length L of the curvilinear side is equal to twice, +/−10%, the height of the triangle, measured perpendicularly to said outer collar.

In a particular embodiment, said vortex generator has a planar shape, oriented downstream by an angle of 20°+/−5°, moving away from said suction face, with respect to the direction of flow upstream of said guide vane.

Advantageously, said vertex closest to the suction face is distant from said suction face by a distance equal to the height (h) of said triangle +/−10%, measured perpendicularly to said outer collar.

The invention also relates to a turbine engine compressor comprising at least one guide vane assembly as described above and a turbine engine equipped with such a compressor.

BRIEF DESCRIPTION OF THE SEVERAL VIEWS OF THE DRAWINGS

The invention will be understood better, and other aims, details, features and advantages thereof will emerge more clearly during the following detailed explanatory description of one or more embodiments of the invention given by way of purely illustrative and non-limitative examples, with reference to the accompanying schematic drawings.

In these drawings.

DETAILED DESCRIPTION OF THE INVENTION

Figure 1:
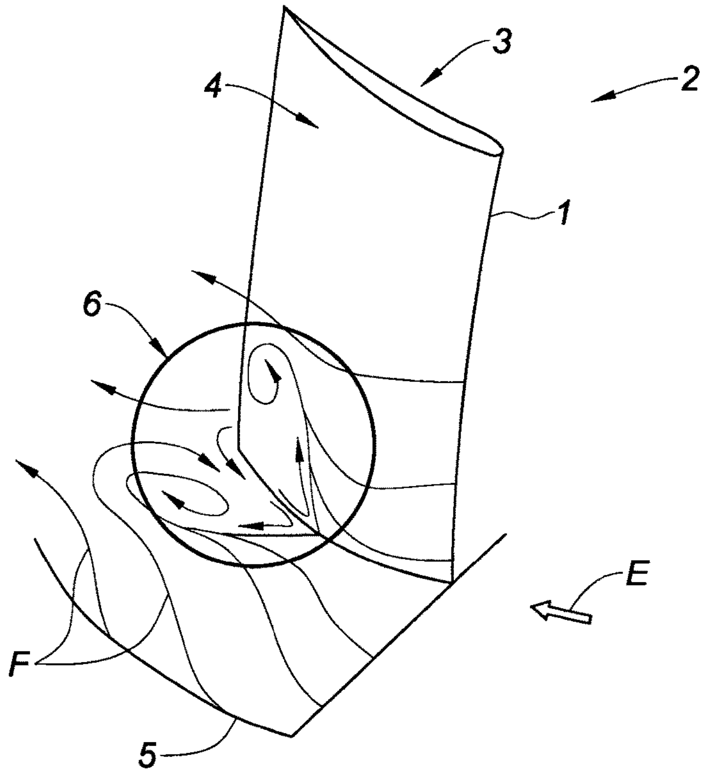
FIG. 1 shows schematically a vane mounted on the inner collar of a compressor guide vane assembly.

Referring to FIG. 1, a vane 1 of a guide vane assembly 2 that forms part of a turbine engine compressor, in particular of an aircraft turbojet engine, can be seen. A compressor conventionally comprises a plurality of successive compression stages, each stage being composed of a rotor and a guide vane assembly. The guide vane assembly 2 comprises a radially outermost collar (not shown in the figure) and a radially innermost collar 5, both serving as a support for the vanes 1. These two collars are concentric, and a plurality of vanes 1 extend, substantially radially, from one to the other, to which they are fixed. These vanes 1 are spaced apart on the circumference of the collars, preferentially uniformly.

In the context of the present invention, the concepts upstream and downstream are defined with respect to the main flow direction of the air in the compressor and the terms axial or radial are relative to the axis of this compressor.

FIG. 1 shows, by means of an arrow E, the main flow direction of the air for a grid of stators functioning at a low angle of incidence, close to the optimum thereof, and by means of arrows F in fine lines the local flows of air at the root of the vane 1, and on the faces, pressure 3 or suction 4, of the vane thereof. At the root of the vane 1, a corner shedding region 6 appears on the suction face 4 thereof. This region starts not at the leading edge of the vane but further downstream, on the last part of the pressure face or suction face thereof.

Figure 2:
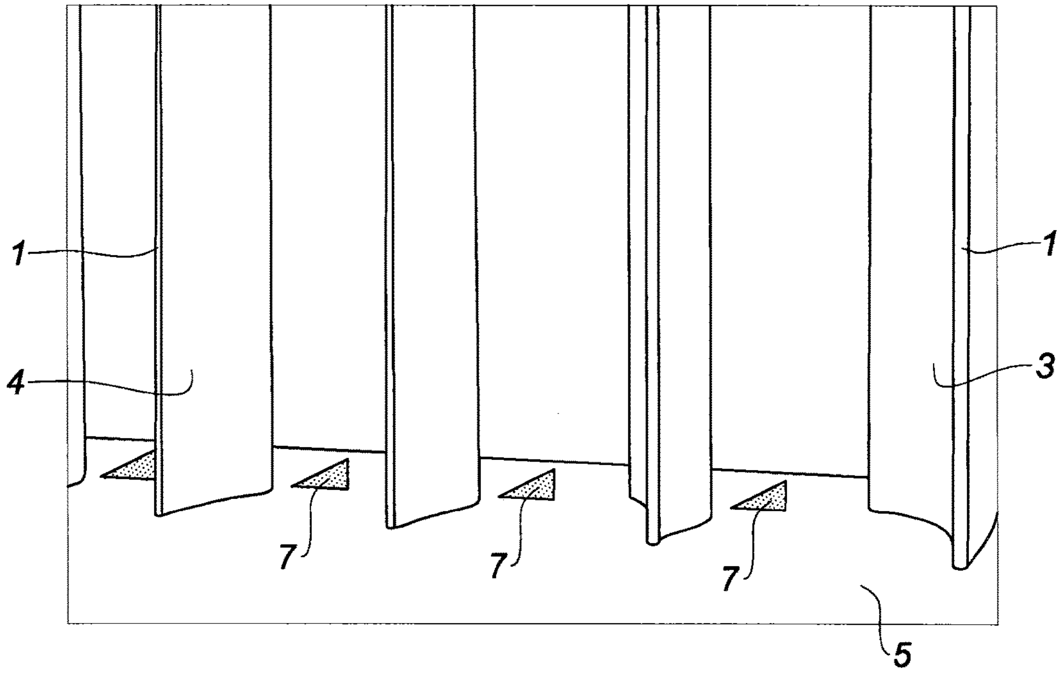
FIG. 2 is a front view of a set of compressor guide vanes, each being provided with a vortex generator according to an embodiment of the invention.

Referring now to FIG. 2, compressor vanes fixed to an inner collar 5, which is chosen with a planar shape for assessment, on a test bench, of the efficacy of the vortex generators, can be seen, viewed from downstream. At the root of the suction face 4 of the vanes 1, on the inner collar 5, vortex generators 7 are fixed.

Figure 3:
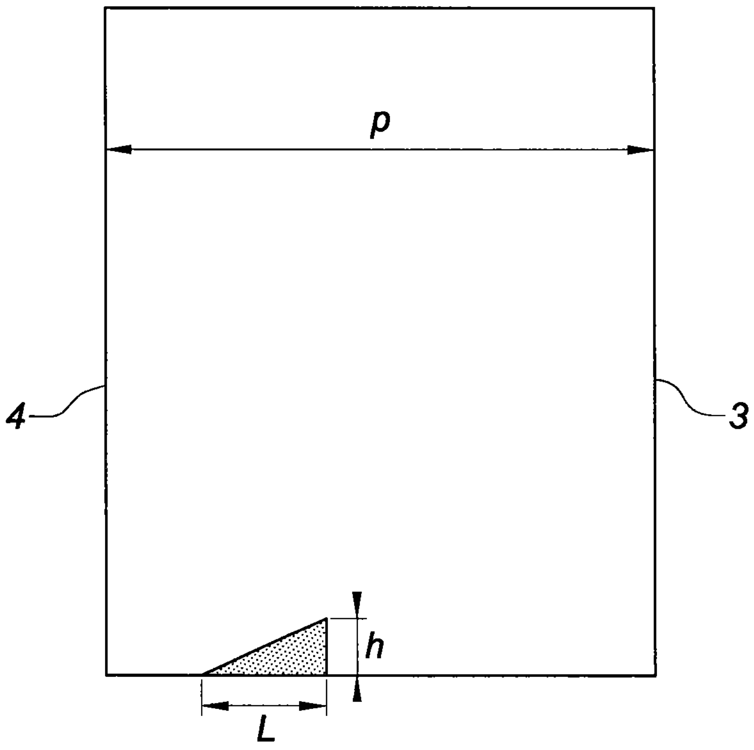
FIG. 3 is a schematic view of the shape in plan view of a vortex generator according to the invention.

As indicated in FIG. 3, these are triangular in shape, extending radially, in the air duct, from the inner collar. The triangle is a right-angled triangle the large side L of which, apart from the hypotenuse, extends along the inner collar whereas the small side or height h extends radially from this collar. As for the hypotenuse, this is oriented in the direction of the junction between the inner collar 5 and the root of the vane 1. The height h is chosen so as to be between 2% and 15%, preferentially between 4% and 8%, of the height of the vane (the radial distance between the two outer and inner collars), while the length L is equal to twice the height h of the generator 7, to within +/−10%.

Figure 4:
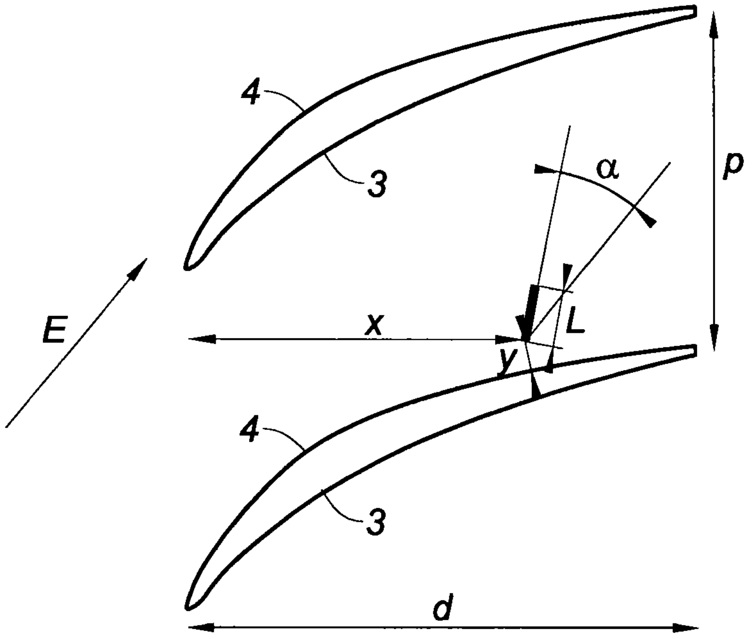
FIG. 4 is a schematic view of the positioning of a vortex generator on the inner collar of the compressor.

The position in the duct of this vortex generator 7 is specified with reference to FIG. 4. The generator 7 is positioned in the inter-vane channel, at an axial distance x from the leading edge of the vanes 1, which is approximately equal, to within +/−10%, to ⅔ of the axial span d of the vanes. Tangentially it is placed at a distance y, measured perpendicularly to the suction face, very close to the suction face 4 of the vane and approximately equal, to within +/−10%, to the height h of the vortex generator 7. Finally, angularly, the radial plane in which the vortex generator is situated forms an angle of approximately 20°, +/−5°, preferentially +/−2°, inclined towards the upstream side moving away from the suction face 4, to the flow of air in the inter-vane channel, the direction of this flow being given by the velocity vector E of the air at the inlet to the inter-vane channel.

Figure 5:
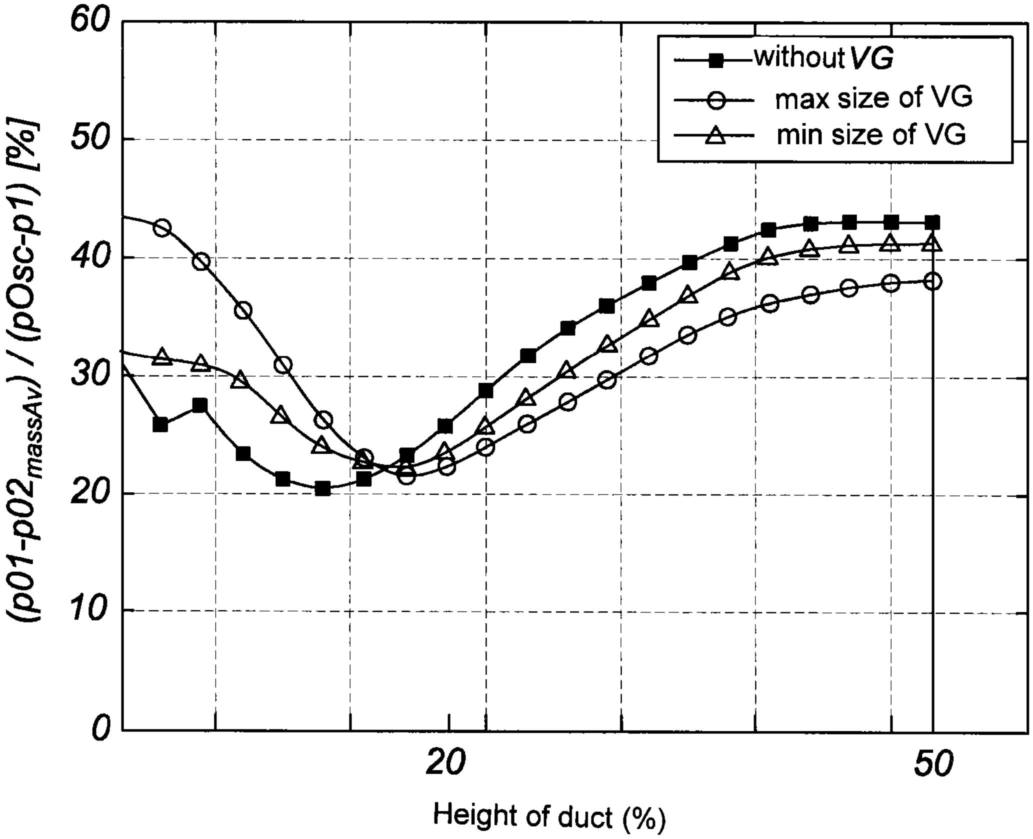
FIG. 5 shows the gain provided by two vortex generators, of different sizes, according to the invention.

Finally, FIG. 5 shows the change in pressure drops along the height of the duct, downstream of the position chosen for installing a vortex generator 7. These are defined as being equal to the ratio between firstly the total pressure difference existing between the upstream and downstream sides of the stator and secondly the difference between the total pressure at infinity upstream and the static pressure upstream of the stator. The curves correspond to three configurations: a curve in the absence of a vortex generator (the curve with squares), a curve with a vortex generator of small size, less than that described with reference to the figures (the curve with triangles) and a curve with the vortex generators of a size according to the invention (the curve with circles).

It can be seen that the curves with a vortex generator are above the curve without a vortex generator over the duct height ranging from 0 to 20%, and therefore that they generate more losses over this proportion of the duct height. On the other hand, these two curves pass below the curve without a vortex generator over the top part of the duct, that is to say above 20%. In total, over the height, the losses are less with the vortex generator than without, and the size adopted for these appears suited to the objective pursued. In summary, though more losses are created locally at the root with the vortex generators, they are compensated for by the gains that the vortex generators 7 generate at the middle of the duct. And finally the total gain over the losses is positive and can be estimated at approximately 1% of the latter.

The invention is characterised by a precise size and position for the vortex generators 7, so as to provide gains on the efficiencies of the compressors compared with existing compressors. The vortex generator must in particular be placed at the start of the shedding region; thus the vortices that they create interact immediately with the corner vortex. Were the vortex generator to be placed, for example, too far upstream, it would not act on the shedding and could not effectively reduce it since it would not be placed at the best point vis-à-vis the shedding region.

The invention has been described in the case of a compressor guide vane assembly that is situated in the primary air duct. It could just as well be used in the case of an outlet guide vane (OGV in the language of persons skilled in the art) wheel that is placed downstream of the blower, in front of the inlet to the secondary flow channel.

The invention claimed is:

1. A device for rectifying airflow in a turbine engine, or in a compressor, the device comprising:

a plurality of fixed vanes extending in a circular fashion between an inner collar and an outer collar concentric with each other and in which an air flow to be compressed circulates;

an inter-vane channel is defined between two adjacent vanes, each vane comprising a suction face and a pressure face opposed transversally, and a leading edge and a trailing edge opposed axially; and a vortex generator to reduce corner vortices, the vortex generator being disposed on the inner collar and extending radially in an air duct from the inner collar, wherein the vortex generator is arranged transversally in the inter-vane channel between the two adjacent vanes and axially between the leading edge and the trailing edge of the adjacent vanes, wherein the vortex generator is arranged in a zone situated axially downstream from a first plane passing through a center of an axial span of the adjacent vanes and transversally near the suction face of one of the adjacent vanes and a second plane passing through a center of an inter-vane distance so as to create a vortex upstream from a shedding zone forming the corner vortices and to interact immediately with the corner vortices, wherein the vortex generator has a triangular planar shape with a first side extending along the inner collar, a second side extending radially, and a third side linked to the first and second sides, the first side having a first apex distant from the suction face by a distance equal to a height of the vortex generator +/−10%, the second side being opposed to the first apex is substantially facing the pressure face of the other of the adjacent vanes, and wherein the height of the vortex generator being measured perpendicularly to the inner collar, is between 2% and 15% of a height of the vane.

2. A device according to claim 1, wherein the vortex generator is in a form of a right-angled triangle, the right angle being situated on a side opposite to the suction face of the vane.

3. A device according to claim 1, wherein a length of a curvilinear side is equal to twice, +/−10%, the height of the vortex generator, measured perpendicularly to the outer collar.

4. A turbine engine compressor comprising at least one device according to claim 1.

5. A turbine engine comprising a compressor according to claim 4.

6. A device according to claim 1, wherein the triangular planar shape has a lowest vertex which is closest to the suction face of an adjacent vane.

* * * * *